United States Patent [19]
Boyd et al.

[11] 3,831,268
[45] Aug. 27, 1974

[54] METHOD OF MAKING AN ELECTRIC MOTOR ARMATURE CORE

[75] Inventors: Edward A. Boyd, Sussex; Joseph R. Harkness, Germantown, both of Wis.

[73] Assignee: Briggs Stratton Corporation, Wauwatosa, Wis.

[22] Filed: Dec. 3, 1973

[21] Appl. No.: 420,940

[52] U.S. Cl. .................. 29/598, 29/205 D, 29/525, 29/609, 72/363, 310/216
[51] Int. Cl. ........................................ H02k 15/02
[58] Field of Search ......... 29/596, 598, 609, 205 D, 29/525; 310/216, 264; 72/363

[56] References Cited
UNITED STATES PATENTS

| | | | |
|---|---|---|---|
| 3,762,041 | 10/1973 | Bair | 29/596 |
| 3,768,152 | 10/1973 | Swanke et al. | 29/596 |

Primary Examiner—Charles W. Lanham
Assistant Examiner—Carl E. Hall

[57] ABSTRACT

An armature core assembly in which the heads of the circumferentially spaced T-shaped teeth that form the peripheral oortion of the laminated coilreceiving core have their opposite end portions taperingly deformed to widen the entrances to the reentrant coil receiving spaces or slots between the T-shaped teeth at opposite ends of the core. A preformed plastic shield or cap of the same size and shape as the laminations which comprise the core, completely covers each end of the core and has protective flanges that embrance the ends of its T-shaped teeth, including the head, the taperingly reduced width of the end portions of the head providing space for those portions of the protective flanges that embrace the heads, so that the presence of these protective flanges does not objectionably reduce the width of the entrances to the wire receiving slots.

10 Claims, 6 Drawing Figures

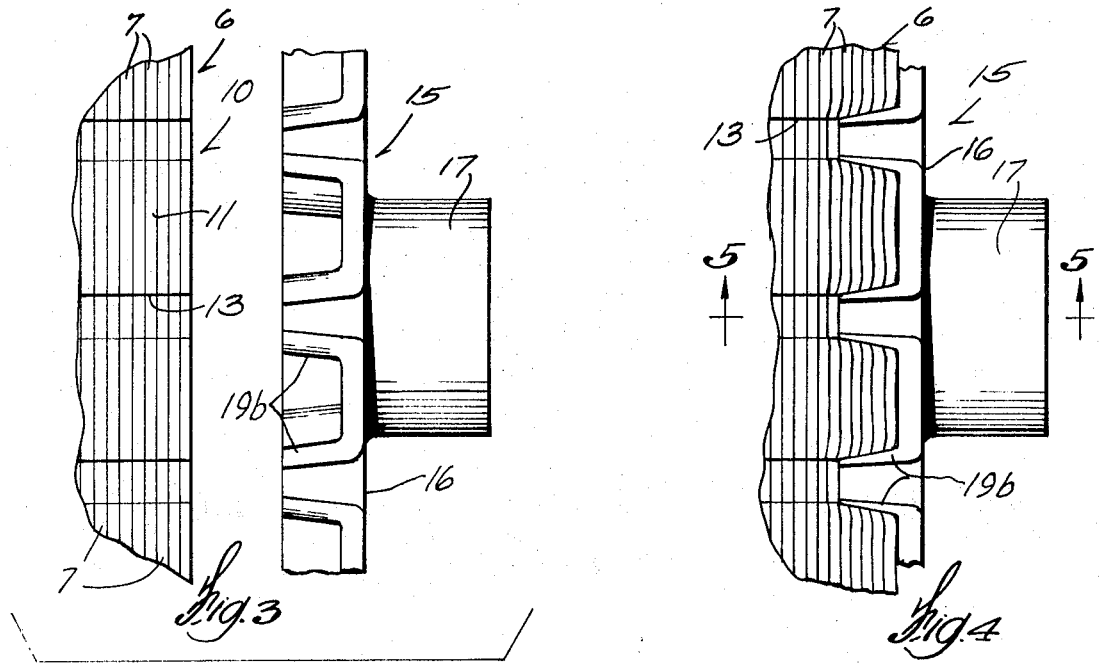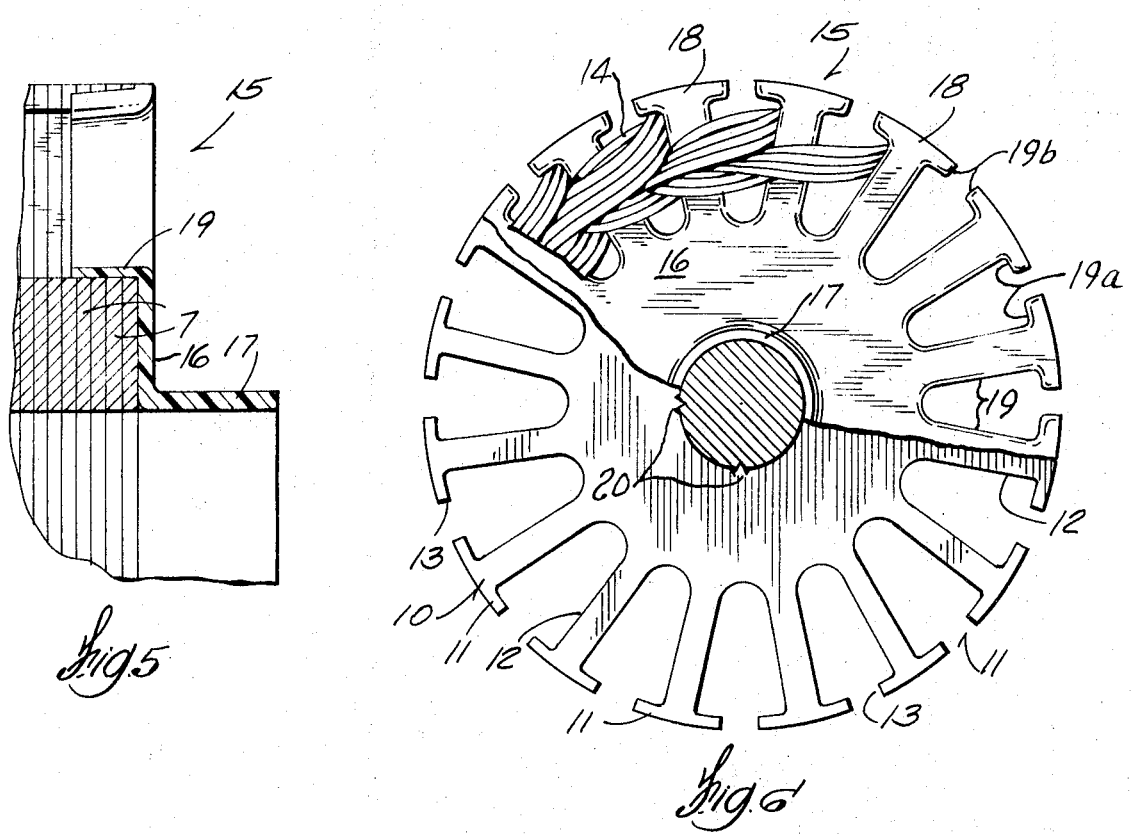

METHOD OF MAKING AN ELECTRIC MOTOR ARMATURE CORE

Armature cores with which this invention is concerned, consist of a stack of laminations press-fitted onto a shaft which also has a commutator mounted thereon. The laminations are punched from relatively thin magnetically permeable metal, usually soft steel. They are of course identical in size and shape with a circle of T-shaped teeth forming the peripheral portion thereof. Accordingly, when a stack of these laminations is assembled on the shaft, they form a cylindrical body that has circumferentially spaced reentrant axially extending slots into which wire is wound into a series of coils.

The wire is wound onto the laminated body or core by automatic armature winding machines in which a pair of flyers rotating about a common axis that perpendicularly intersects the axis of the armature core, simultaneously lays two wires into two pairs of the circumferentially spaced slots.

The orbit defined by each of the rotating flyers defines a plane that chordally intersects the laminated body or core at a distance from the axis of the core determined by the design of the winding with which the armature core is to be provided. Although the winding machine has shrouds that embrace opposite sides of the core and have smooth surfaced guide shoes to guide the wires into the slots in which they are wound, and hopefully keep the wires from snagging on the edges of the entrances to the core slots, experience has demonstrated that this ideal situation is by no means an assured reality. Only too often the wire rubs across one of the sharp edges defining the entrance to the wire receiving slots as it enters the slot and, when that occurs, the insulation on the wire is damaged and the wound armature becomes a reject, or a potential failure in service.

The problem is especially serious when the design of the motor for which the armature is intended requires that the armature be wound with heavy gage wire, and where the entrances to the reentrant wire receiving slots are narrow in order to minimize the interruptions in the cylindrical surface of the armature core.

It was also discovered that the side thrust which the wire imposes on the ends of the T-shaped teeth that separate the wire receiving slots as the wire enters a slot, often deformed the teeth and actually caused the endmost laminations to turn on the shaft.

The present invention overcomes all of these problems by the simple expedient of securing preformed plastic caps or shields to the opposite ends of the stack of laminations, which shields or caps are of the same size and shape as the laminations and have protective flanges projecting from the side thereof facing the laminations to embrace the ends of the teeth that separate the wire receiving slots and cover the edges defining the ends of the slots. Not only do those shields or caps cover the stems of the T-shaped teeth on several of the endmost laminations, but also the heads thereof.

A significantly advantageous feature of the invention resides in the fact that the plastic shields embrace the heads of the T-shaped teeth, without objectionably reducing the width of the slot entrances through which the wire must pass as it is wound into the slots.

With these observations and objectives in mind, the manner in which the invention achieves its purpose will be appreciated from the following description and the accompanying drawings, which exemplify the invention, it being understood that changes may be made in the precise method of practicing the invention and in the specific product disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 3 is a detail view, at an enlarged scale, of the tops of two adjacent T-shaped teeth which collectively form the peripheral portion of the laminated core body, and the portion of the plastic shield or cap that will embrace the adjacent ends of those teeth after the shield or cap is in position;

FIG. 4 is a view similar to FIG. 3 but showing how - during application of the plastic shield or cap - the heads of the T-shaped teeth are deformed and taperingly reduced in width towards the end of the stack, to make room for the protective flanges of the shield that embrace the teeth;

FIG. 5 is a detail sectional view through FIG. 4 on the plane of the line 5—5; and FIG. 6 is a cross sectional view through FIG. 1 on the plane of the line 6—6, with a few coils of wire in place for illustrative purposes.

Figure 1:
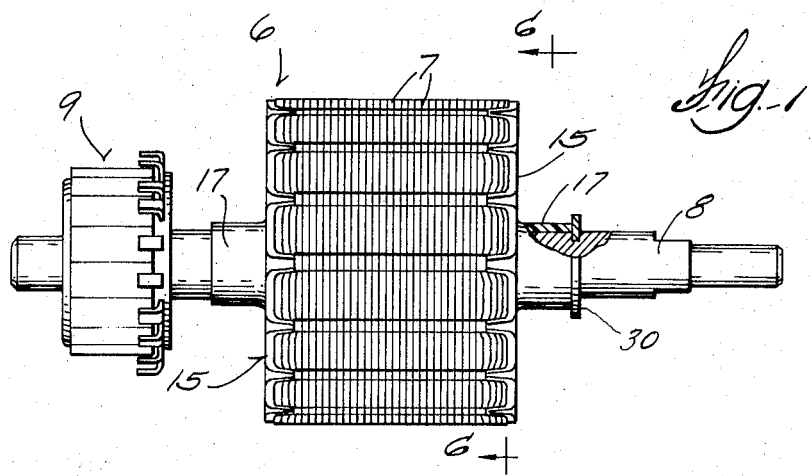
FIG. 1 is a side view of an armature core made in accordance with this invention.

Referring now particularly to the accompanying drawings, and especially to FIG. 1, the numeral 6 designates the coil receiving body or core of an armature core assembly made in accordance with this invention, and which consists of a stack of round laminations 7 punched from flat strip stock - usually mild steel - and press-fitted onto a shaft 8. A commutator 9 is also mounted on the shaft.

The cylindrical periphery of the stack of laminations which comprise the core is formed by the heads 10 of a circle of T-shaped teeth 11. The teeth thus form between them a plurality of axially extending circumferentially spaced reentrant coil receiving slots 12, with narrow entrances 13 formed by the spaces between the heads of the T-shaped teeth. It should be noted that the width of these entrances is not many times greater than the diameter of the wire that is wound into the reentrant slots, a few coils of which are shown in FIG. 6, at 14.

Overlying each of the opposite ends of the laminated core of body 6 is a preformed plastic shield or cap 15. These shields or caps are preferably injection molded from Nylon, and hence have great strength. They consist of a flat disc 16 of the same size and shape as the laminations 7, with a central hub 17 projecting from one side of the disc. Since the disc 16 has the same shape as the laminations, its peripheral portion consists of outwardly radiating circumferentially spaced T-shaped teeth or fingers 18. Along the edges of these teeth or fingers and uninterruptedly around the roots of the spaces between them, there are protective flanges 19 which project perpendicularly from the side of the disc 16 opposite that from which the hub 17 projects.

The protective flanges have portions 19a located at the undersides of the heads of the T-shaped teeth or fingers, and other portions 19b at the opposite ends of the head of the T. Accordingly, when the shields or caps are in place, they cover all of the edges at the ends of the laminated body 6 with which the wire could conceivably come in contact during the winding operation, and since the material of which the shields or caps are formed is smooth surfaced, all danger of having the insulation on the wire damaged in any way, is eliminated.

While the embracing relationship of the flanges 19 with the stems of the T-shaped teeth on several of the endmost laminations 7 inevitably reduces the width of the wire-receiving slots at the opposite ends thereof, that reduction is inconsequential from the standpoint of space for the coils of wire that will be laid into those slots, and moreover has the beneficial effect of keeping the wire out of contact with the sides and bottom of the slots.

Another very important advantage that flows from having the flanges 19 embrace the stems of the T-shaped teeth is the assurance that results therefrom that the endmost laminations will not be displaced rotationally about the shaft by the side thrust which the wire being laid into the slots imposes on the teeth. Because the flanges 19 encompass all of the teeth on quite a number of the endmost laminations, the torque that results from the wire imposed side thrust is successfully resisted by even the slight keying action obtained from having relatively slight longitudinally extending protrusions 20 on the shaft bite into the bore of the stack of laminations as it is pressed onto the shaft.

Bearing in mind that the space between the heads of the T-shaped teeth that form the periphery of the laminated body or core 6 are quite narrow, it is evident that unless space is made available for the portions 19b of the protective flanges that embrace the heads of the T-shaped teeth at the axially opposite ends of the stack of laminations, the presence of these flange portions would unduly restrict the entrances through which the wire initially enters the reentrant slots 12 during the winding operation. That necessary space is made available by a novel deformation of the heads of the T-shaped teeth on a plurality of the endmost laminations at both ends of the stack. This is done by compressing or squeezing the heads of the teeth with a force that is progressively less on the inwardly successive laminations. That squeezing action taperingly enlarges the entrances to the wire receiving slots at both ends of the body or core 6, and thereby provides the needed space for the protective flange portions 19b, as best seen in FIG. 4.

Also as best seen in FIG. 4, the circumferentional squeezing force applied to the heads of the T-shaped teeth on the laminations near the ends of the stack, so deforms those heads that they assume a nested wavelike shape that is more pronounced towards the ends of the stack.

Figure 2:
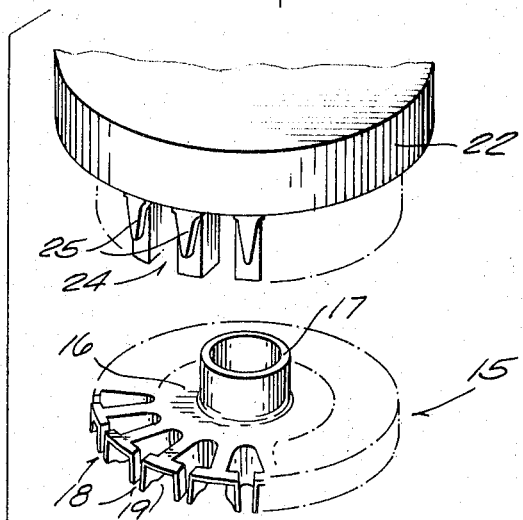
FIG. 2 is an exploded perspective view illustrating the procedure and tooling employed in assembling the stack of laminations and its plastic end shields or caps onto the shaft.
Figure 2:
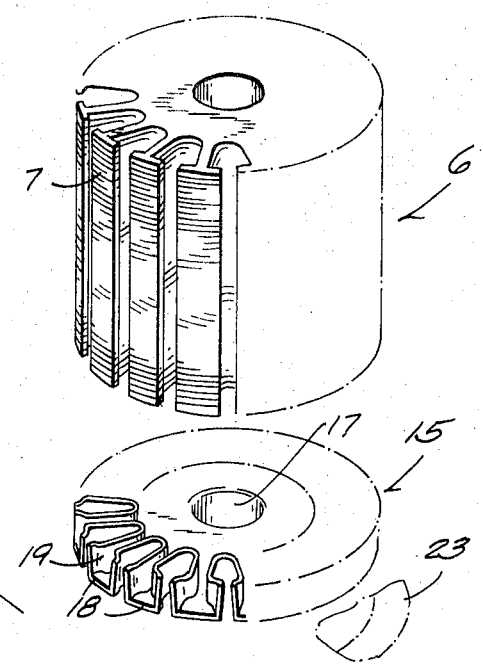

While the compressive force that deforms the heads of the T-shaped teeth at the opposite ends of the stack of laminations could be produced and applied in different ways, in practice it is done by clamping the stack of laminations with the shields or caps 15 at the opposite ends thereof between a pair of shaping rings or tools 22 and 23 by means of a suitable press, not shown. Each of these shaping rings has a circle of fingers 24 projecting from one side and, as shown in FIG. 2, they are so placed in the press that the fingers of each ring point towards the other ring. The fingers are so located that they enter the spaces between the radiating teeth of the shields or caps 15 and project into the slots in the laminated core or body as the shaping rings are forced towards each other by the press. On the radially outer faces of the fingers 24, there are wedges 25 that enter the spaces between the heads 10 of the T-shaped teeth on the endmost groups of laminations. It is the entry of these wedges between the heads of the T-shaped teeth that deforms the heads and taperingly enlarges the entrances to the reentrant slots at the ends of the core to provide space for the protective flange portions 19b of the shields or caps 15.

Since the shields or caps are in place at the time the deforming operation takes place, the compressive force is, of course, applied through the flange portions 19b. As a result, the radially outermost portions of the shields or caps tightly hug the heads of the T-shaped teeth of the armature core and cover the same for an appreciable distance inwardly of the ends of the core, without objectionably restricting the entrances of the wire receiving slots of the core.

While - for the reasons just stated - it is preferable to apply the shaping force to the heads of the T-shaped teeth of the armature core with the plastic shields or caps in place, it could be done before the shields or caps are applied to the ends of the core, but obviously this would entail another operation.

In practice, is has been found desirable to first press fit the commutator onto the shaft, then slide the plastic shield or cap - which is to cover the adjacent end of the laminated core - onto the shaft, with its hub facing the commutator. The stack of laminations and the other shield or cap are then placed in the press with the shield bottommost and setting on the bottom shaping ring 23. The shaft, with the commutator and shield in place thereon, is then inserted into the bore of the stack of laminations with the commutator end of the shaft uppermost. The press is now activated and, in one operation, the shaft is driven into and through the stack of laminations and the heads of the T-shaped teeth at the opposite ends of the stack are subjected to the circumferential squeezing force that gives them the desired tapered shape.

As the stack of laminations is forced onto the shaft by the closing action of the press, the "key" forming ridges 20 on the shaft bite into the laminations to secure the same against rotation relative to the shaft, and as the press opens a conventional spring loaded ejector lifts the assembly off the lower shaping ring 23. Upon removal of the assembly from the press, a C-washer 30 is applied to the shaft to provide a thrust bearing surface at the end of the hub of the shield that is remote from the commutator.

While the plastic shields or caps greatly improve the armature core by covering all edges on the ends of the core that could damage the insulation of the wire as it is wound onto the core, the deformation of the heads of the T-shaped teeth at the axially opposite ends of the core in the manner described even without the protection afforded by the shields or caps, results in a significantly improved armature core. This follows from the fact that the deformation bends the ends of the heads of the T-shaped teeth axially inward and thus converts an otherwise sharp edge or corner into a smooth surface across which the wire can slide without damage to its insulation.

Those skilled in the art will appreciate that the invention can be embodied in forms other than as herein disclosed for purposes of illustration.

The invention is defined by the following claims:

1. The method of making an electric motor armature, wherein a stack of punched laminations, each of which has a circular row of substantially T-shaped teeth defining its circumference said teeth having heads defined by the cross member of the T, is assembled in aligned relationship on a shaft to form a cylindrical core having circumferentially spaced reentrant winding receiving slots opening to its periphery through narrow axially extending slots formed by the spaces between the heads of the circumferentially adjacent teeth of the laminations, said method being characterized by:

deforming the heads of the T-shaped teeth on a plurality of the endmost laminations at both ends of the stack by bending the extremities of the heads inwardly with a progressively lesser curvature on the inwardly successive laminations, to thereby taperingly enlarge the entrances to the winding receiving slots at both ends of the core and provide smooth surfaces for said entrances.

2. The method of claim 1, wherein said deformation of the heads of the T-shaped teeth is done by inserting a wedge between adjacent teeth.

3. The method of making an electric motor armature, wherein a stack of punched laminations, each of which has a circular row of substantially T-shaped teeth defining its circumference said teeth having heads defined by the cross member of the T, is assembled in aligned relationship on a shaft to form a cylindrical core having circumferentially spaced reentrant winding receiving slots opening to its periphery through narrow axially extending slots formed by the spaces between the heads of the circumferentially adjacent teeth of the laminations, said method being characterized by:

circumferentially squeezing the heads of the T-shaped teeth on a plurality of the endmost laminations at both ends of the stack with a force that is progressively less on the inwardly successive laminations to thereby deform the heads of the T-shaped teeth on said inwardly sucessive laminations to a progressively less degree and taperingly enlarge the entrances to the winding receiving slots at both ends of the core.

4. The method of claim 3, further characterized in that said deformation of the heads of the T-shaped teeth is performed with a tool that has wedge-shaped lugs positioned to enter the spaces between the heads of the T-shaped teeth as said tool is forced axially towards the stack.

5. The method of claim 4, further characterized by covering the ends of the stack of laminations with preformed plastic shields of a size and shape substantially corresponding to that of the endmost laminations.

6. The method of claim 5, wherein the ends of the heads of those of the T-shaped teeth that are deformed are covered by portions of the plastic shields, and the presence of said portions of the shields is accommodated by said deformation of the heads of the T-shaped teeth.

7. The method of claim 6, further characterized in that said portions of the shields are interposed between opposite ends of the heads of the teeth and the wedge-shaped lugs of said tool as the latter is forced axially towards the stack, so that the tooth-head deforming force is applied through said portions of the plastic shields and said portions of the plastic shields are driven tightly against the ends of the heads of the T-shaped teeth.

8. The method of making an electric motor armature, wherein a stack of punched laminations, each of which has a circular row of substantially T-shaped teeth defining its circumference said teeth having heads defined by the cross member of the T, is assembled in aligned relationship on a shaft to form a cylindrical core having circumferentially spaced reentrant winding receiving slots opening to its periphery through narrow axially extending slots formed by the spaces between the heads of the circumferentially adjacent teeth of the laminations, said method being characterized by:

A. providing preformed plastic shields for the ends of the stack of laminations of a size and shape substantially corresponding to the size and shape of the laminations, but with protective flanges projecting from one face thereof to embrace the T-shaped teeth on the endmost laminations of the stack;

B. with one of said shields overlying an end of the stack of laminations with the protective flanges of the shield facing said end of the stack, forcing said shield against the adjacent end of the stack with the protective flanges on the shield covering the edges of the teeth on the endmost laminations; and C. deforming the heads of the T-shaped teeth on a plurality of the endmost laminations of the stack with a circumferentially acting compression force applied through the contiguous protective flange portions and that has progressively less effect on the inwardly successive laminations to thereby axially outwardly taperingly reduce the width of the heads of the teeth and make room for the contiguous protective flanges on the shield, whereby the presence of said protective flanges does not objectively diminish the width of the adjacent entrances to the winding receiving slots.

9. The method of claim 8 wherein the shield is forced against the adjacent end of the stack of laminations and the heads of the T-shaped teeth are deformed at the same time by forcing a tool that has wedge-shaped lugs positioned to enter the spaces between the heads of the T-shaped teeth, axially towards the stack.

10. The method of claim 9, further characterized in that one of said shields is forced against each of the opposite ends of the stack of laminations and said tooth-head deforming operation takes place at each end of the stack, and wherein said operations are performed by axially clamping the stack and the shields at the ends thereof between a pair of said tools.

* * * * *